United States Patent [19]

Spisak

[11] 3,891,276
[45] June 24, 1975

[54] WHEEL AND WHEEL TRIM ASSEMBLY
[75] Inventor: Edward G. Spisak, Westland, Mich.
[73] Assignee: S & S Product Engineering Service, Inc., Wyandotte, Mich.
[22] Filed: Aug. 2, 1973
[21] Appl. No.: 386,389

[52] U.S. Cl. ............................. 301/37 R; 301/37 T
[51] Int. Cl. .............................................. B60b 7/00
[58] Field of Search ............. 301/37 R, 37 ST, 37 P, 301/37 T, 37 TC, 37 SS, 37 C, 37 CD, 37 TP, 37 B; 24/73 FT, 90 E, 90 F, 113 MP, 259 FS; 296/31 P

[56] References Cited
UNITED STATES PATENTS

| 1,920,575 | 8/1933 | Lyon | 301/37 T |
|---|---|---|---|
| 1,968,076 | 7/1934 | Goodyear | 301/37 TC |
| 2,157,960 | 5/1939 | Lyon | 301/37 R |
| 2,212,038 | 8/1940 | Lyon | 301/37 R |
| 2,212,039 | 8/1940 | Lyon | 301/37 R |
| 2,279,333 | 4/1942 | Lyon | 301/37 R |
| 2,455,151 | 11/1948 | Wood | 301/37 CD |
| 2,757,986 | 8/1956 | Lyon | 301/37 B |
| 3,006,691 | 10/1961 | Lyon | 301/37 T |
| 3,208,119 | 9/1965 | Seckerson | 24/259 PW |
| 3,756,658 | 9/1973 | Adams | 301/37 R |
| D140,202 | 1/1945 | Aske, Jr. | 301/37 R |

FOREIGN PATENTS OR APPLICATIONS

| 597,128 | 5/1960 | Canada | 301/37 TP |
|---|---|---|---|
| 436,544 | 10/1935 | United Kingdom | 301/37 TC |

Primary Examiner—M. Henson Wood, Jr.
Assistant Examiner—D. W. Keen
Attorney, Agent, or Firm—Hugh L. Fisher

[57] ABSTRACT

A wheel and wheel trim assembly for a metal wheel rim and disc having a plastic ornamental wheel cover portion attached to the rim and disc. The assembly has a plurality of axially extending fingers extending into one or more circumferential grooves formed in the radial face of the plastics cover portion. Tabs extending from the fingers act to grip the sides of the groove to retard withdrawal of the fingers and hence separation of the assembly from the wheel rim.

6 Claims, 3 Drawing Figures

PATENTED JUN 24 1975 3,891,276

WHEEL AND WHEEL TRIM ASSEMBLY

This invention relates to wheel structures and more particularly to wheel structures having ornamental wheel trim attached to the wheel proper.

In order to simulate cast wheel assemblies there have been developed wheels having metal rim and disc portions having a plastic cover molded or bonded thereto, the plastic portion having an outer ornamental surface. When it is desirable to attach metal ornamental wheel trim to the wheel structure, conventional attaching means are not satisfactory since the usual exposed flange portions are covered by the ornamental plastic portion of the wheel.

It is therefore an object of the invention to provide a combined wheel and wheel trim assembly where the wheel trim can easily be attached to a plastic ornamental portion of the wheel.

Other objects and advantages will be readily apparent from the following specification and accompanying drawings in which.

Figure 1:
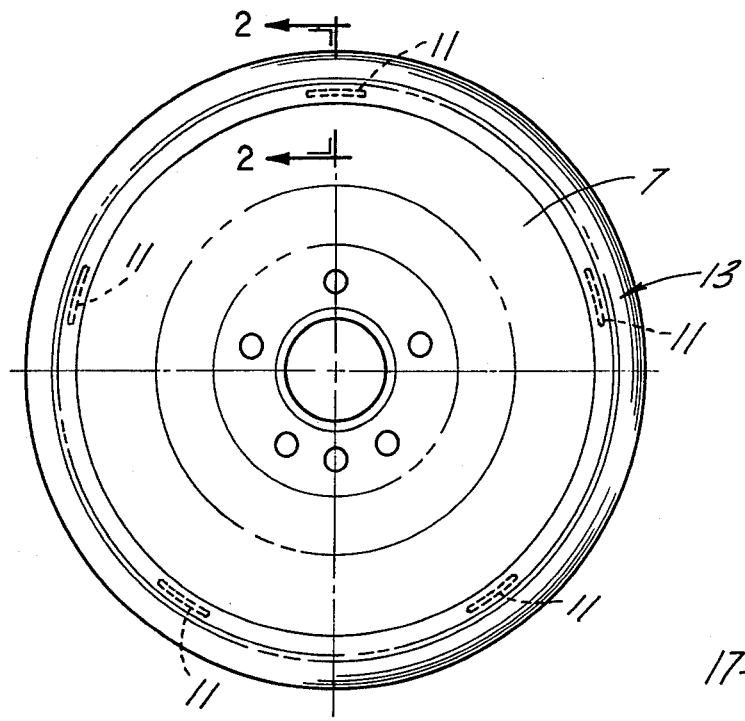
FIG. 1 is a side elevational view of a wheel and wheel trim assembly incorporating the principles of the invention.
Figure 3:
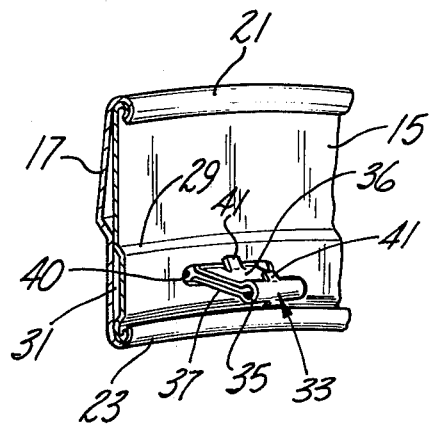
FIG. 3 is a cutaway perspective view of the wheel trim showing additional details.
Figure 2:
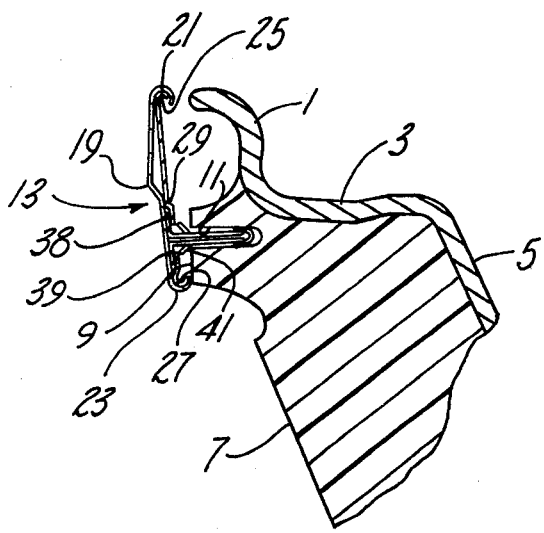
FIG. 2 is an enlarged fragmentary sectional view taken on the line 2—2 of FIG. 1 showing details of the wheel trim attaching means.

The wheel structure includes a conventional metal tire rim assembly including an outer radial flange 1, an intermediate tire receiving flange 3 and a side flange 5. The flange 5 is connected to a main central disc portion (not shown.) Secured by molding or bonding to the rim assembly is a one piece molded plastic portion 7 having suitable designs and shapes molded therein. Polyurethane makes an ideal material since it has high strength, is resilient and abrasive resistant. The molded plastic portion 7 has a radial face 9 at its outer periphery adjacent to the junction between the flange portions 1 and 3. A circumferential groove 11 is formed in the portion 7, extending into the face 9. It will be apparent that the groove 11 need not be a continuous groove but could be a series of circumferentially spaced grooves as illustrated in FIG. 1.

The wheel trim assembly generally indicated 13, includes a pair of stamped rings defining inner and outer faces thereof formed by an inner wall 15 and an outer wall 17. The outer wall is bent at 19 for appearance and strength and is either made of a nonrusting material such as stainless steel or aluminum or is chrome plated. The two walls 15 and 17 are secured together by any suitable means such as by rolling the edges 21 and 23 of wall 17 over the ends 25 and 27 of the inner wall 15. The inner wall 15 is also bent at 29 to strengthen the wall 15 and also to provide a clearance 31 between the walls 15 and 17 which serves a purpose to be described below.

The wheel trim assembly 13 carries a plurality of attaching finger assemblies generally indicated 33. The finger assemblies 33 are composed of a single piece folded around a radius 35, back adjacent to itself into back to back portions 36 and 37 and have two oppositely extending flange portions 38 and 39. Thus a pair of back-to-back L shaped portions are formed to produce a T-shaped member having the cross portion consisting of portions 38 and 39 located in the clearance 31 between the walls 15 and 17. The inner wall 15 has a plurality of apertures 40 through which the main portion of the T extends. A plurality of upstanding resilient tabs 41 serve a dual purpose. The outer tabs act as groove engaging or anchor members to engage the surface of the groove 11. Due to the angle of the tabs and the relatively sharp edges thereon they bite into the plastic groove and prevent the wheel trim from being removed or otherwise coming off the wheel. The tabs adjacent to the wheel trim engage the inner wall 15 above and below the aperatures 40 to hold the finger assembly 33 secure and prevent movement relative to the wheel trim assembly 13 during assembly and after.

The finger assemblies 33 are located circumferentially around the wheel trim assembly 13 so as to hold the assembly 13 on the wheel at a plurality of locations. It will be apparent to those skilled in the art that modifications may be made in the trim ring, fastener, and wheel without departing from the invention which is limited only by the following claims:

I claim:

1. A wheel structure comprising a tire receiving rim assembly having an outer radial flange and having an ornamental plastic portion attached thereto and extending radially adjacent said outer radial flange, said portion having an outer face provided with circumferentially extending groove means, said groove means also axially extending inward from the outer face of the portion, ornamental wheel time having inner and outer faces, a plurality of circumferentially spaced attaching finger means axially extending from the inner face into said groove means, said finger means having groove engaging means thereon detachably contacting the opposite surfaces of the groove means and acting to hold the wheel trim attached to the portion.

2. The wheel structure of claim 1 wherein said groove means extends around the face of the plastic portion.

3. A wheel structure comprising a tire receiving rim assembly having an ornamental plastic portion attached thereto, said portion having an outer face provided with circumferentially extending groove means, said groove means also axially extending inward from the outer face of the portion, ornamental wheel trim having inner and outer faces, a plurality of circumferentially spaced attaching finger means axially extending from the inner face into said groove means, said finger means having groove engaging means thereon detachably contacting the opposite surfaces of the groove means and acting to hold the wheel trim attached to the portion, said wheel trim comprising inner and outer walls secured together, the inner wall being provided with an aperture, and said finger means comprising a plurality of T shaped members each having a cross portion thereof located between the walls, said finger means extending through the aperture in the inner wall and into said groove means.

4. The wheel structure of claim 3 wherein said T shaped finger members further comprise a pair of L shaped back-to-back portions secured together at one end and at the opposite end having oppositely extending flange portions defining the cross portion between the inner and outer walls.

5. The wheel structure of claim 1 wherein said groove engaging means comprise radially extending tab portions having relatively sharp edges engaging the opposite surfaces of the groove means.

6. The wheel structure of claim 3 wherein the finger means have additional radially extending tab portions contacting the inner wall adjacent to the apertures to hold the finger means secure between the inner and outer walls.

* * * * *

UNITED STATES PATENT OFFICE
CERTIFICATE OF CORRECTION

Patent No. 3,891,276          Dated June 24, 1975

Inventor(s) Edward G. Spisak

It is certified that error appears in the above-identified patent and that said Letters Patent are hereby corrected as shown below:

Column 2, line 28, claim 1, after "wheel" delete "time" and insert --trim--.

Signed and Sealed this twenty-fifth Day of November 1975

[SEAL]

Attest:

RUTH C. MASON
*Attesting Officer*

C. MARSHALL DANN
*Commissioner of Patents and Trademarks*